(12) United States Patent
Stadtfeld et al.

(10) Patent No.: US 9,999,934 B2
(45) Date of Patent: Jun. 19, 2018

(54) GEAR CUTTER WITH RADIAL ADJUSTABILITY OF SQUARE OR RECTANGULAR STICK BLADES

(71) Applicant: THE GLEASON WORKS, Rochester, NY (US)

(72) Inventors: Hermann J. Stadtfeld, Webster, NY (US); Anthony J. Norselli, Hilton, NY (US)

(73) Assignee: THE GLEASON WORKS, Rochester, NY (US)

( * ) Notice: Subject to any disclaimer, the term of this patent is extended or adjusted under 35 U.S.C. 154(b) by 423 days.

(21) Appl. No.: 14/442,736

(22) PCT Filed: Dec. 11, 2013

(86) PCT No.: PCT/US2013/074227
§ 371 (c)(1),
(2) Date: May 14, 2015

(87) PCT Pub. No.: WO2014/093411
PCT Pub. Date: Jun. 19, 2014

(65) Prior Publication Data
US 2015/0306688 A1   Oct. 29, 2015

Related U.S. Application Data

(60) Provisional application No. 61/737,525, filed on Dec. 14, 2012.

(51) Int. Cl.
*B23C 5/24* (2006.01)
*B23F 21/16* (2006.01)
(Continued)

(52) U.S. Cl.
CPC .......... *B23C 5/2472* (2013.01); *B23C 5/2489* (2013.01); *B23C 5/2493* (2013.01);
(Continued)

(58) Field of Classification Search
CPC ..... B23C 5/2472; B23C 5/109; B23C 5/2247; B23C 2210/168; B23C 5/2226;
(Continued)

(56) References Cited

U.S. PATENT DOCUMENTS 1,836,472 A * 12/1931 Jacobs .................... B23C 5/242
407/38
2,385,750 A * 9/1945 Weddell .................. B23C 5/242
144/241
(Continued)

FOREIGN PATENT DOCUMENTS

AT          006939 U1    6/2004
GB          839812 A     6/1960
(Continued)

OTHER PUBLICATIONS

International Search Report and Written Opinion for PCT/US2013/074227, ISA/EPO, dated Mar. 27, 2014, 12 pgs.

*Primary Examiner* — Sara Addisu
(74) *Attorney, Agent, or Firm* — Robert L. McDowell

(57) ABSTRACT

A bevel gear manufacturing face cutter head (2) for face hobbing and face milling. The cutter head has blade positioning slots (20) having a four-sided shaped cross-section and positive blade seating surfaces (22, 24). The cutter head also has the capability to clamp cutting blades (8) tight to the positive blade seating surfaces and to adjust the cutting blades radially after they are pre-clamped and axially located.

13 Claims, 9 Drawing Sheets

(51) Int. Cl.
*B23F 21/12* (2006.01)
*B23F 21/22* (2006.01)

(52) U.S. Cl.
CPC .......... *B23F 21/126* (2013.01); *B23F 21/166* (2013.01); *B23F 21/226* (2013.01)

(58) Field of Classification Search
CPC  B23C 5/2234; B23C 5/08; B23C 5/06; B23C 5/20; B23C 5/165; B23C 5/2204; B23F 21/126
See application file for complete search history.

(56) References Cited

U.S. PATENT DOCUMENTS

| | | | | | |
|---|---|---|---|---|---|
| 2,517,668 | A * | 8/1950 | Howald | ................ | B23C 5/2472 |
| | | | | | 407/35 |
| 2,586,955 | A * | 2/1952 | Kaiser | .................... | B23C 5/242 |
| | | | | | 407/38 |
| 3,195,376 | A * | 7/1965 | Bader | .................. | B23C 5/2441 |
| | | | | | 407/49 |
| 3,332,130 | A * | 7/1967 | Armstrong | ............ | B23C 5/2427 |
| | | | | | 407/44 |
| 3,574,251 | A * | 4/1971 | Corti | ........................ | B23C 5/20 |
| | | | | | 407/45 |
| 4,137,001 | A * | 1/1979 | Fountain | ............... | B23F 21/226 |
| | | | | | 407/115 |
| 4,197,038 | A * | 4/1980 | Hipp | .................... | B23F 21/226 |
| | | | | | 407/22 |
| 4,268,194 | A * | 5/1981 | Bloink | ................. | B23F 21/226 |
| | | | | | 407/22 |
| 4,318,433 | A * | 3/1982 | Amundsen | ............. | B27G 13/12 |
| | | | | | 144/230 |
| 4,580,929 | A * | 4/1986 | Gehri | ..................... | B23C 5/242 |
| | | | | | 407/37 |
| 4,993,890 | A * | 2/1991 | Tukala | ................... | B23C 5/207 |
| | | | | | 407/34 |
| 5,896,902 | A * | 4/1999 | Maybon | ............... | B23B 27/145 |
| | | | | | 144/208.1 |
| 6,299,389 | B1 * | 10/2001 | Barazani | ................. | B23B 27/04 |
| | | | | | 144/173 |
| 6,334,740 | B1 * | 1/2002 | Qvarth | .................... | B23C 5/207 |
| | | | | | 407/36 |
| 6,511,264 | B2 * | 1/2003 | Ripley | .................. | B23C 5/2493 |
| | | | | | 407/36 |
| 6,632,050 | B2 * | 10/2003 | Erickson | ............... | B23F 21/226 |
| | | | | | 407/21 |
| 9,137,954 | B2 * | 9/2015 | Leonardi | ............. | A01G 23/067 |
| 9,216,458 | B2 * | 12/2015 | Sashin | ................ | B23B 27/1696 |
| 9,272,343 | B2 * | 3/2016 | Voege | .................. | B23C 5/1045 |
| 2002/0053266 | A1 * | 5/2002 | Enquist | ................ | B23B 27/1655 |
| | | | | | 82/1.11 |
| 2003/0103818 | A1 * | 6/2003 | Astrom | ..................... | B23C 5/08 |
| | | | | | 407/41 |
| 2004/0025969 | A1 * | 2/2004 | Lindsay | ................. | B23C 5/207 |
| | | | | | 144/241 |
| 2004/0131432 | A1 * | 7/2004 | Riviere | ..................... | B23C 5/08 |
| | | | | | 407/40 |
| 2004/0161311 | A1 * | 8/2004 | Satran | ....................... | B23C 5/08 |
| | | | | | 407/46 |
| 2004/0191008 | A1 * | 9/2004 | Noggle | .................... | B23C 5/06 |
| | | | | | 407/46 |
| 2004/0191009 | A1 * | 9/2004 | Toyose | ..................... | B23C 5/00 |
| | | | | | 407/46 |
| 2005/0117981 | A1 * | 6/2005 | Satran | ....................... | B23C 5/08 |
| | | | | | 407/117 |
| 2006/0120812 | A1 | 6/2006 | Hecht et al. | | |
| 2007/0183857 | A1 * | 8/2007 | Wihlborg | .................. | B23C 5/06 |
| | | | | | 407/67 |
| 2009/0196701 | A1 * | 8/2009 | Wihlborg | .................. | B23C 5/08 |
| | | | | | 408/230 |
| 2010/0254774 | A1 * | 10/2010 | Hecht | .................. | B23B 27/007 |
| | | | | | 407/101 |
| 2011/0150584 | A1 * | 6/2011 | Hakamada | ................ | B23C 5/08 |
| | | | | | 407/46 |
| 2011/0150585 | A1 * | 6/2011 | Hakamada | ................ | B23C 5/08 |
| | | | | | 407/47 |
| 2011/0222973 | A1 * | 9/2011 | Baer | ........................ | B23C 5/08 |
| | | | | | 407/44 |
| 2011/0305533 | A1 * | 12/2011 | Kisselbach | ............... | B23C 5/04 |
| | | | | | 407/48 |
| 2013/0129435 | A1 * | 5/2013 | Ortlund | ................... | B23B 27/16 |
| | | | | | 407/70 |
| 2014/0363243 | A1 * | 12/2014 | Koik | ....................... | B23C 5/165 |
| | | | | | 407/100 |
| 2015/0030397 | A1 * | 1/2015 | Heinloth | .................. | B23C 5/08 |
| | | | | | 407/12 |
| 2015/0056026 | A1 * | 2/2015 | Hecht | ....................... | B23C 5/22 |
| | | | | | 407/47 |
| 2015/0125223 | A1 * | 5/2015 | Morrison | ................ | B23B 27/16 |
| | | | | | 407/5 |
| 2015/0165527 | A1 * | 6/2015 | Roman | ................. | B23C 5/2213 |
| | | | | | 407/103 |
| 2015/0196959 | A1 * | 7/2015 | Morrison | .............. | B23C 5/2273 |
| | | | | | 407/108 |
| 2015/0290725 | A1 * | 10/2015 | Stadtfeld | ................ | B23F 21/126 |
| | | | | | 407/44 |
| 2015/0328697 | A1 * | 11/2015 | Jiang | ..................... | B23C 5/2226 |
| | | | | | 407/46 |
| 2016/0288221 | A1 * | 10/2016 | Westfal | ................ | B23C 5/2221 |

FOREIGN PATENT DOCUMENTS

GB          2483694 A        3/2012
JP          09057520 A   *   3/1997   .......... B23C 5/2472

* cited by examiner

GEAR CUTTER WITH RADIAL ADJUSTABILITY OF SQUARE OR RECTANGULAR STICK BLADES

This application claims the benefit of U.S. Provisional Patent Application No. 61/737,525 filed Dec. 14, 2012, the entire disclosure of which is hereby incorporated by reference.

FIELD OF THE INVENTION

The present invention is directed gear manufacture and in particular to a bevel gear face cutter head for face hobbing and face milling

BACKGROUND OF THE INVENTION

Bevel and hypoid gears can be cut in a single or intermittent indexing process (face milling) or in a continuous indexing process (face hobbing). A basic cutting setup in the generating or cradle plane will put the center of the cutter head in a position which is away from the generating gear center (cradle axis) by the amount of the so called radial distance. The silhouette of the cutter blades represents one tooth of the generating gear while the cutter rotates. Common face cutters for bevel gear cutting have several blade groups with each group having between one and four blades. The most common cutters are alternating (completing) cutters with one outside and one inside blade per blade group. In order to achieve an equal chip load of all inside blades and all outside blades during the cutting process, the cutting edges of all outside blades preferably follow each other at the same radial position. Also all inside blades should follow each other at the same radial position. In other words, all cutting edges of one kind (inside or outside) should generate the same cone surface while the cutter is rotating.

Manufacturing tolerances of the cutter head body, the blade blanks and deviations in blade profile grinding will introduce different cutting edge locations for the different blades in one cutter head.

While older face cutter systems allowed an adjustment of the radial blade position, today's stick blade systems have no provisions in order to accomplish a direct radial adjustment. However, known techniques which achieve a radial change of the cutting edge location include:

1. If a stick blade is moved in an axial position which is different from the nominal position, then the radius in the cutter reference plane increases or reduces by approximately $\Delta R = \Delta s \cdot \tan \alpha$, where $\Delta s$ is a positive or negative axial movement of the stick blade and a is the blade pressure angle (for example, see U.S. Pat. No. 5,839,943).
2. If a stick blade is clamped with two clamp screws (upper and lower), then the increase of the torque of the upper or lower screw can move the blade tip slightly radially, if the stick blade is not exactly straight or if the normal slot wall is not exactly plane.

The disadvantage of the above method 1 is that the blade tips of all axially shifted blades will be moved out of their common tip plane. While the blade adjustment improves the radial cutting edge location, it causes a runout of the blade tips. The blade tip runout will contribute to premature tip wear of the blades.

The disadvantage of the above method 2 is that the cutter requires two clamp screws per blade and that the torque of those two clamp screws has to be chosen depending on the individual inaccuracy of blade and slot. It is also possible that due to the particular shape of blade and slot, no change in blade radius such as an increase of the blade radius or a reduction of the blade radius will occur. In such a case, an adjustment of this particular slot/blade combination might not be possible. Method 2 is based on coincidences which can only be controlled by time consuming trial and error loops.

SUMMARY OF THE INVENTION

The present invention is directed to a bevel gear manufacturing face cutter head for face hobbing and face milling wherein the cutter head comprises positive blade seating and the capability to clamp the blades tight to the positive seating surfaces and to adjust the stick blades radially after they are pre-clamped and axially located.

The inventive cutter head is generally disc-shaped and rotatable about a cutter head axis. The cutter head comprises a first side and a second side, one or more cutting blade positioning slots arranged in the cutter head with each of the blade positioning slots extending between the first and second sides. The blade positioning slots each have at least one blade seating surface extending between said first and second sides with the blade seating surface having a modified shape and extending from the first side to the second side wherein the modified shape departs from the shape of a continuous straight-line shaped seating surface extending from the first side to the second side.

Preferably, the modified shaped seating surface includes a first portion extending from one of the first or second side to a predetermined location between the first and second sides with the first portion having a first shape, and a second portion extending from the predetermined location to the other of the first or second side with the second portion having a shape such that the shape of the first portion and the shape of the second portion together do not describe a continuous straight line (same slope throughout) extending from the first side to the second side. The first portion is preferably straight and the second portion is preferably curved.

DETAILED DESCRIPTION OF THE PREFERRED EMBODIMENT

Figure 1:
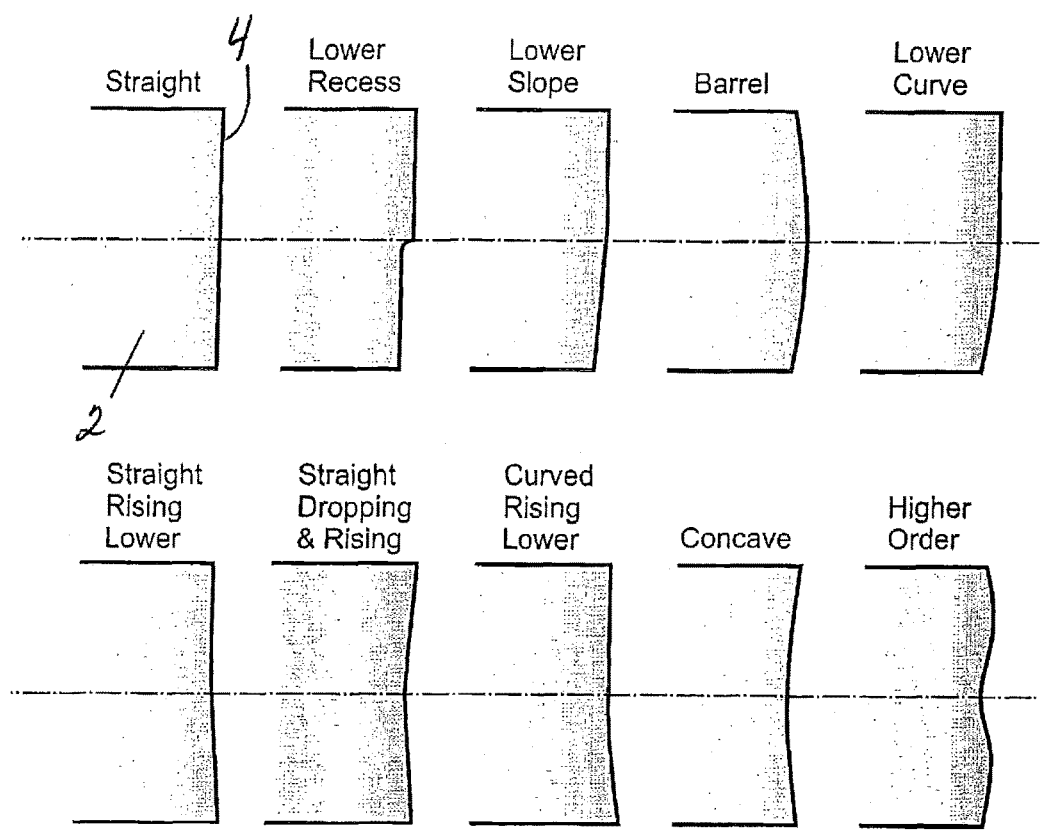
FIG. 1 shows a plurality of different kind of seating surface modifications on cutter head slots for stick blades.

The terms "invention," "the invention," and "the present invention" used in this specification are intended to refer broadly to all of the subject matter of this specification and any patent claims below. Statements containing these terms should not be understood to limit the subject matter described herein or to limit the meaning or scope of any patent claims below. Furthermore, this specification does not seek to describe or limit the subject matter covered by any claims in any particular part, paragraph, statement or drawing of the application. The subject matter should be understood by reference to the entire specification, all drawings and any claim below. The invention is capable of other constructions and of being practiced or being carried out in various ways. Also, it is understood that the phraseology and terminology used herein is for the purposes of description and should not be regarded as limiting.

The details of the invention will now be discussed with reference to the accompanying drawings which illustrate the invention by way of example only. In the drawings, similar features or components will be referred to by like reference numbers. The use of "including", "having" and "comprising" and variations thereof herein is meant to encompass the items listed thereafter and equivalents thereof as well as additional items.

Although references may be made below to directions such as upper, lower, upward, downward, rearward, bottom, top, front, rear, etc., in describing the drawings, there references are made relative to the drawings (as normally viewed) for convenience. These directions are not intended to be taken literally or limit the present invention in any form. In addition, terms such as "first", "second", "third", etc., are used to herein for purposes of description and are not intended to indicate or imply importance or significance unless expressly indicated.

The invention is directed to a bevel gear cutter head with one or more cutting blades that can be adjusted radially in a determined way, without or with a minimum of side effects. Those side effects include blade tip height variation, a blade offset variation, blade rotation around its length axis, and/or a loss of blade seating stiffness.

Blade seating surfaces can be modified from their straight (plane) initial shape with a recess, a slope in the lower (or upper) section, a barrel shape, a curved recess in the lower (or upper) section, a straight rising shape in the lower (or upper) section, a straight dropping and rising shape, a curved rising shape in the lower (or upper) section, a concave shape or a higher order modification as shown in FIG. 1.

FIG. 1 shows examples of different modifications of seating surfaces 4 in cutting blade positioning slots in cutter heads 2 for stick or bar type cutting blades. The straight seating surface is state of the art and the invention provides seating surfaces having shapes that depart from the straight-line shape of a continuous straight seating surface between opposed sides of a cutter head (e.g. compare "Straight" and "Lower Curve" shapes of FIG. 1). Lower recess, lower slope, lower curve, straight rising and curved rising are modifications which also can be made in the upper area of the seating surface which is closer to the cutting edge stick out. The initial seating is preferably provided by a straight portion, not a modified portion of a seating surface. An increase of the torque of the clamp screw which is located in the recessed area will lead to a blade inclination (and some blade bending) which will change the radial location of the blade tip. Straight dropping and rising has its low point at the dash dotted line, it can be reversed in order to have the high point at the dash dotted line. Straight dropping and rising as well as concave and higher order modifications allow radial blade tip movement if a screw is present at the dash dotted line and elastically deforms the blade.

Figures 2A, 2B:
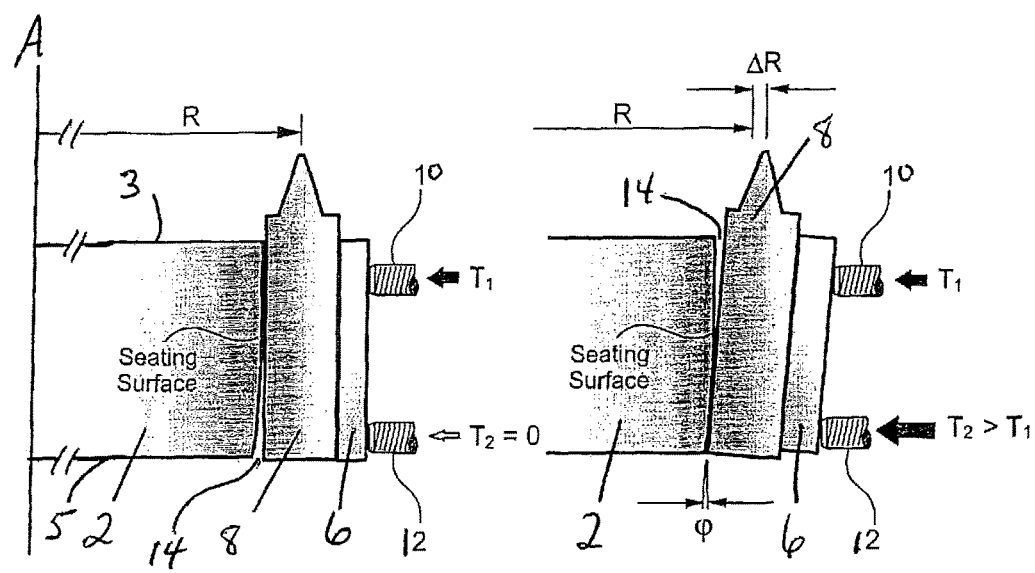
FIG. 2(a) shows cross section of a cutter head with a stick blade which is connected to the cutter head with a clamp block and two clamp screws with only the upper clamp screw being under torque.
FIG. 2(b) shows the same cross section as FIG. 2(a) with the lower clamp screw having a higher torque than the upper clamp screw.

FIGS. 2(a) and 2(b) show the inventive blade adjustment principle with reference to a cutter head 2 having a top surface 3, a bottom or back surface 5 and being rotatable about a cutter axis, A, and having a cutter radius, R. A blade position slot having a modified seating surface is shown extending between top surface 3 and bottom surface 5. A stick blade 8 is pressed with a clamp block 6 onto a modified seating surface (e.g. "Lower Curve" of FIG. 1) without torque from lower screw 12 (FIG. 2a) and with torque from lower screw 12 which is higher than torque from upper screw 10 (FIG. 2b). If the blade clamping force of the upper screw 10 can be held constant or nearly constant due to elasticity of the upper clamp screw, the clamping torque of the lower screw 12 can be increased in order to swing the cutting blade 8 by effectively rolling the cutting blade 8 on the modified seating surface in the clockwise direction thereby radially adjusting the position of the blade tip. The elasticity in the upper clamp screw arrangement prevents a significant clamp force increase in the top section and a blade rolling rather than a blade deflection occurs. If the upper clamp screw 10 does not have sufficient elasticity, a combination of blade bending and blade rolling occurs which still will allow a radial adjustment of the cutting blade 8. In both cases, the gap 14 between blade and seating surface is transferred from the bottom section (FIG. 2a) to the top section (FIG. 2b). If the shown seating surface is perpendicular to the axial direction of the clamp screws, then the result is a reduction of clamping stiffness.

Depending on the number of clamp screws or pressure points (e.g. one, two or three), blade tip movement, ΔR, in the radial direction R can be achieved depending on the torque of the clamp provisions (see FIG. 2b). One side effect is a change of the cutting edge pressure angle by φ. A second side effect is the gap 14 between blade and slot in the upper or lower section of the seating surface, which may reduce the blade seating stiffness.

Figure 3A:
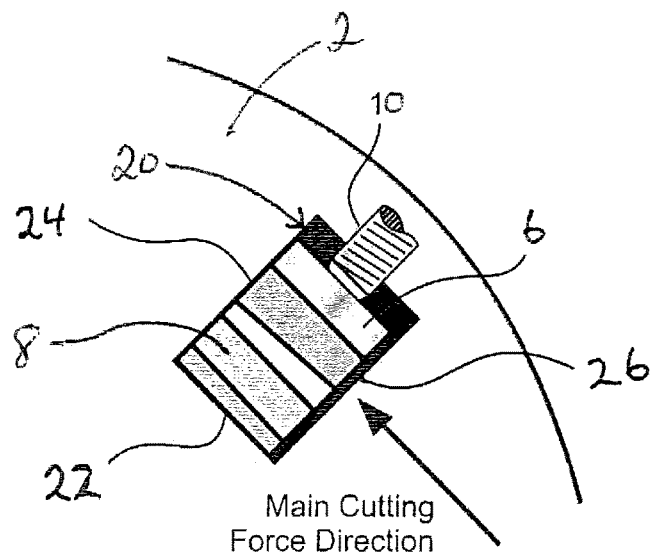
FIG. 3(a) shows a stick blade pressed with one clamp screw and a clamp block onto the radial seating surface.

The inventive cutter head design preferably accommodates a stick blade system of the type having a four-sided shaped (e.g. square or rectangular) blade cross-section. FIG. 3(a) shows a stick blade 8 having a rectangular cross-section pressed with one clamp screw 10 and a clamp block 6 onto a radial seating surface 22 of a blade positioning slot 20 of a cutter head 2. The connection between blade 8 and cutter head 2 is a friction seating (between clamp block 6 and radial seating surface 22). The clamp block 6 can be pressed with one screw 10 as shown or with two or more screws against the blade. Before any cutting is conducted, a gap 26 is required in order to slide a cutting blade 8 freely into the slot 20 at the time when a cutter is built (i.e. assembled). At this time, the entire gap 26 or part of it may be between the blade 8 and the radial seating surface 22. The main cutting force can slide the blade 8 along the radial seating surface 22 due to the limited friction seating. This in turn will not only reduce the positioning accuracy of the blade, but it can also lead to cutting edge chipping and reduced tool life.

Figure 3B:
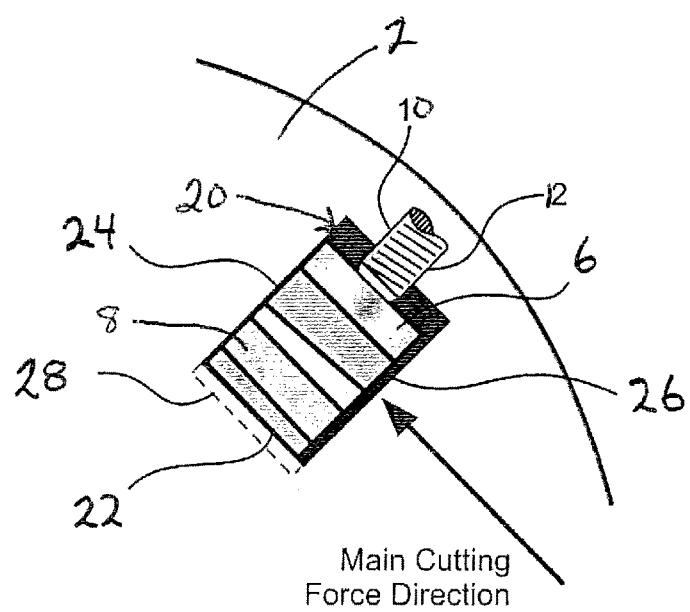
FIG. 3(b) shows a stick blade pressed with one clamp screws and a clamp block onto the radial seating surface. A second clamp screw is located below the first clamp screw (see FIG. 2a or 2b) presses the blade into a lower radial recess.

FIG. 3(b) shows a stick blade 8 pressed with one clamp screw 10 and a clamp block 6 onto the radial seating surface 22. A second clamp screw 12 is located below the first clamp screw (see FIG. 2(a)) and presses the blade into a radial modification 28 such as, for example, the "Lower Curve" in FIG. 1. The force from the second clamp screw 12 will move the lower portion of the blade 8 radially towards the center of the cutter head. The blade will pivot at the location of the transition between seating surface 22 and modification 28 and the tip of the blade will move to a slightly larger radius.

Figure 4:
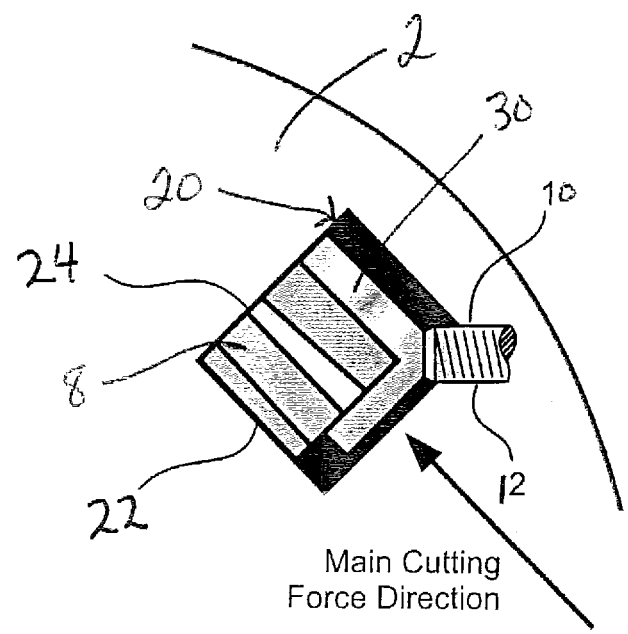
FIG. 4 shows a two dimensional top view onto blade with a rectangular cross section in a cutter head slot. The blade is pressed by an angular clamp block and one or more corner screws against the two seating surfaces.

In the embodiment of FIG. 4, the inventive cutter head comprises a stick blade system with rectangular blade cross section and a positive blade seating between the two seating surfaces and an angular clamp block which contacts the corner of a cutting blade 8 and at least a portion of the sides of a cutting blade which intersect to define the blade corner. The cutting blade 8 is pressed by an angular clamp block 30 and one or more corner screws 10, 12 against the two seating surfaces 22, 24 thereby providing a positive (form) seating between the angular clamp block 30 and the two seating surfaces 22, 24.

Figure 5:
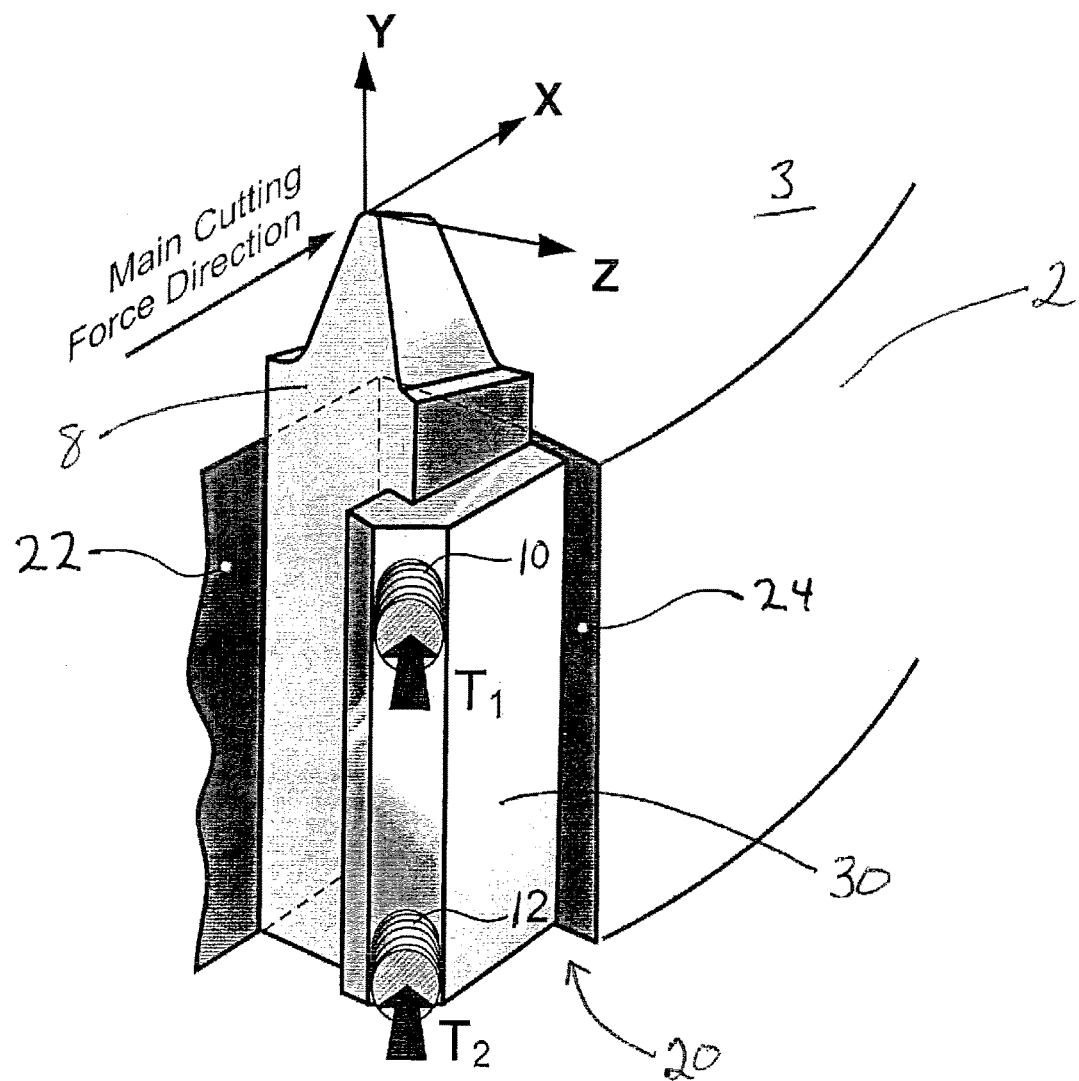
FIG. 5 shows a three dimensional view of a blade with a rectangular cross section and positive seating in a cutter head slot.

FIG. 5 shows a view of a cutting blade 8 with a rectangular cross section and positive seating in a cutter head slot 20. The clamp screw torques $T_1$ and $T_2$ generate clamp forces against the corner of the angular clamp block 30. The clamp screw forces will press the stick blade 8 against the two seating surfaces 22, 24. The radial seating surface 22 locates the blade radially and the tangential seating surface 24 provides the reaction force against the main cutting force.

Figure 6:
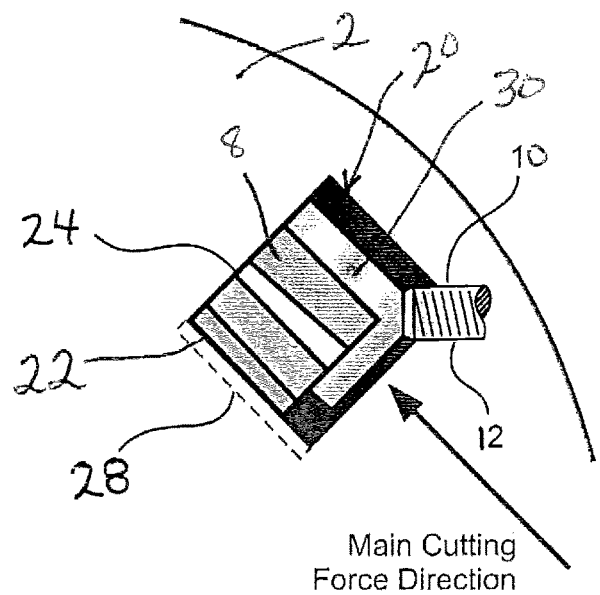
FIG. 6 shows a two dimensional top view onto blade with a rectangular cross section in a cutter head slot. The dashed lines indicate the modification of the radial seating surface in the lower (not visible) section of the seating surface.

In FIG. 6, the dashed lines indicate the modification 28 of the radial seating surface 22 in the lower (not visible) section of the seating surface. The two corner clamp screws 10 and 12 have only limited possibilities to move the stick blade 8 into the modification recess 28. The upper clamp screw 10 will only press the upper section of blade 8 onto the tangential and unmodified upper section of the radial seating surface 22. The lower screw 12 will have a component against the radial seating surface 22 which may be able to overcome frictional forces to move the lower part of the blade 8 from the tangential seating surface 22 into the modification recess 28.

Figure 7:
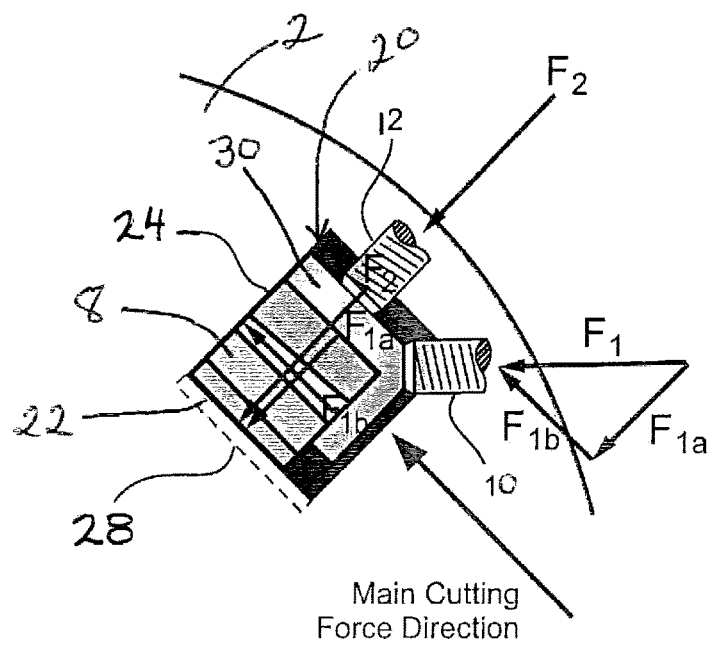
FIG. 7 shows a two dimensional top view onto blade with a rectangular cross section in a cutter head slot. The dashed lines indicate that the lower section of the tangential seating surface is modified. The upper clamp screw is oriented on the corner of the angular clamp block while the lower clamp screw is oriented radially.

In FIG. 7, the upper clamp screw 10 is oriented on the corner of the angular clamp block 30 and presses the stick blade 8 with its two force components ($F_{1a}$ and $F_{1b}$) onto the upper sections of the radial seating surface 22 and the tangential seating surface 24 (positive seating). The lower clamp screw 12 is oriented radially and presses the blade 8 with its entire clamp force, $F_2$, into the recess 28 in the lower portion of the radial seating surface 22. The contact force becomes a maximum at the line where the seating surface modification begins. The blade 8 will pivot around this line ("P" in FIG. 8) and move with its lower portion into the modification recess 28. At the same time, the tip 32 of the blade 8 will move in the opposite direction which will change the blade tip radius. The clamp force on the lower clamp screw controls the radial movement of the blade tip 32. While the blade rotates around the pivot axis P, a sufficient seating contact between cutter slot 20 and stick blade 8 on the tangential seating surface 24 is maintained. Such a rotation will reduce the radial seating pressure in the blade top area and increase the pressure between blade 8 and clamp block 30 in the upper clamp block section. Sufficient surface pressure will be maintained between the cutting blade 8 and the tangential seating surface 24 in particular in the upper area. This is an important feature of the inventive cutter head design since the main cutting forces are oriented in tangential direction which will result in a well clamped blade with good seating stiffness.

Figure 8:
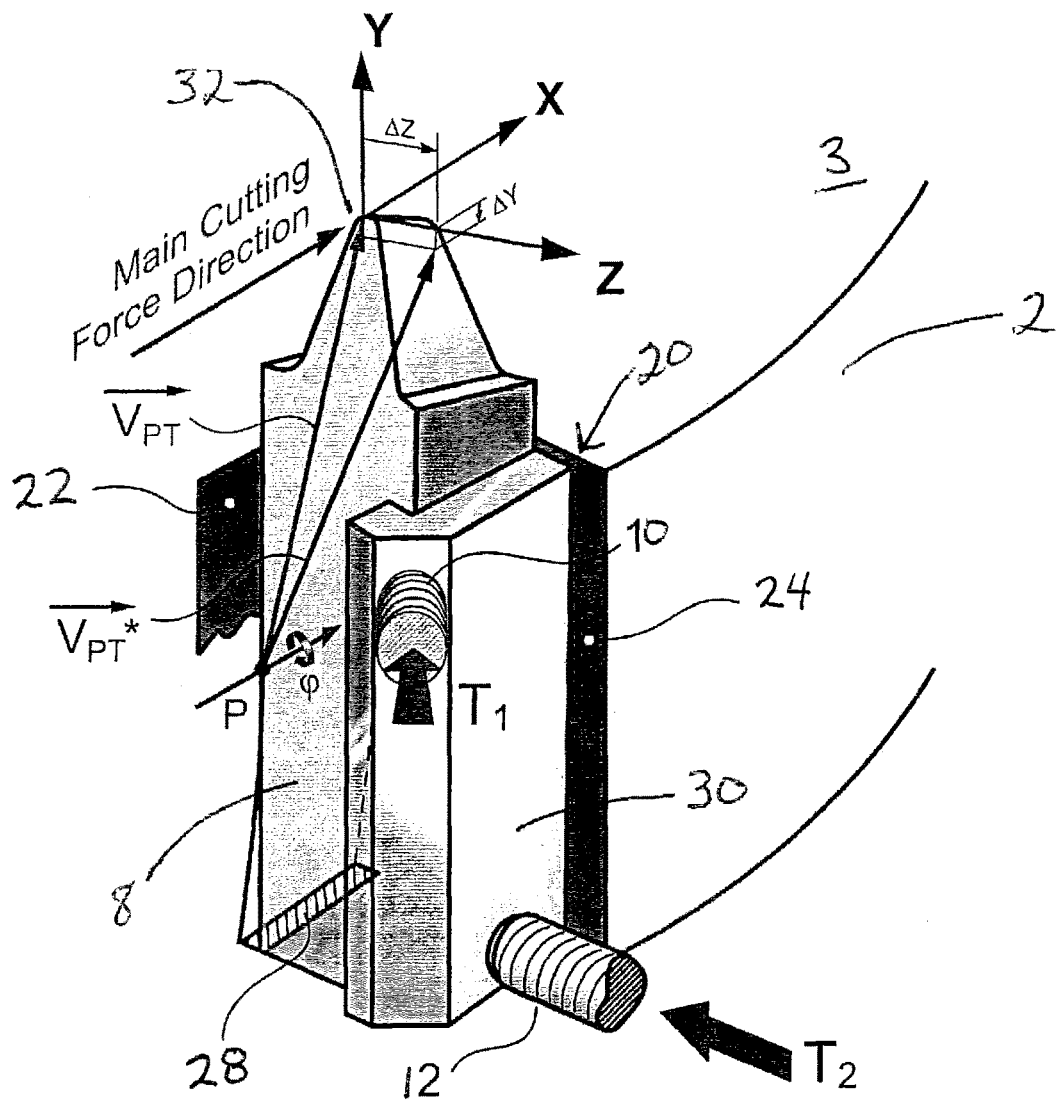
FIG. 8 shows a three dimensional view of a blade with a rectangular cross section and positive seating in a cutter head slot. The lower section of the seating surface which is oriented tangentially to the cutting circle is modified.

FIG. 8 shows the pivoting axis P lies at the beginning of the modification vector and is oriented in the same direction as the X-axis of the coordinate system and φ is the direction of blade rotation for blade adjustments. $V_{PT}$ is the pivot-tip-distance vector before blade adjustment, $V_{PT}^*$ is the pivot-tip-distance vector after adjustment. The adjustment moves the blade in ΔZ direction, which is the desired radial change of the blade tip location. Due to the rotational sliding of the cutting blade, an accompanying ΔY change also occurs. While such a ΔY change would generally be considered to be undesirable, the inventors have determined that such an effect is small and has only negligible influence to the tooth geometry formed by the cutting process. An additional side effect of the inventive blade adjustment is the angular change of the cutting edge in the same magnitude than the blade rotation (or rolling) angle φ. However, radial blade adjustments in the 0.010 mm range change the effective cutting edge pressure angle by 1 angular minute. Such a variation from blade to blade is also negligible to the cutting performance and the produced flank geometry.

As an example, a mathematical description of the blade tip movement as result of an adjustment was made using the coordinate system shown with the blade 8 and slot 20 in FIG. 8. The horizontal axis of rotation P is perpendicular to the tangential seating surface 24. In order to achieve a rotation around P, where P is parallel to the X-axis of the coordinate system in FIG. 8, a rotation matrix for a rotation around the X-axis is used. Then a rotation around the X-axis of the amount of a large but realistic rotation φ (depending on the seating surface modification magnitude) is chosen with φ=0.08°.

The blade adjustment rotation about the X-axis of φ is:

$$(PHI) = \begin{pmatrix} 1 & 0 & 0 \\ 0 & \cos\varphi & -\sin\varphi \\ 0 & \sin\varphi & \cos\varphi \end{pmatrix}$$

The initial pivot-tip-distance vector for a realistic medium pitch blade is:

$$\vec{V}_{PT} = \{V_{PTX}, V_{PTY}, V_{PTZ}\} = \{3 \text{ mm}, 32 \text{ mm}, 6 \text{ mm}\}$$

A multiplication of the pivot-tip-distance vector with the matrix (PHI) will result in the exact rotation of the pivot-tip-vector around the horizontal axis P:

$$\vec{V_{PT*}} = (PHI) \times \vec{V_{PT}}$$

The result of the vector-matrix multiplication is shown below in its general form:

$$\vec{V_{PT*}} = \begin{pmatrix} V_{PTX} \\ V_{PTY} \cos\varphi - V_{PTZ} \sin\varphi \\ V_{PTY} \sin\varphi + V_{PTZ} \cos\varphi \end{pmatrix}$$

If the vector components of $V_{PT}$ and the angle $\varphi$ are substituted into the three component formulas above, then the result for the pivot-tip-distance vector after adjusting can be obtained:

$$\vec{V_{PT*}} = \{3.000 \text{ mm}, 31.992 \text{ mm}, 6.04467 \text{ mm}\}$$

The subtraction of the pivot-tip-distance vector before adjustment from the pivot-tip-distance vector after adjustment delivers the components of blade tip position change due to the adjustment.

$$\Delta X = V_{PTX}* - V_{PTX} = 0.000 \text{ mm}$$

$$\Delta Y = V_{PTY}* - V_{PTY} = -0.008 \text{ mm}$$

$$\Delta Z = V_{PTX}* - V_{PTZ} = 0.045 \text{ mm}$$

The blade pressure angle change is equal to the rotation $\varphi$:

$$\Delta\alpha = \varphi = 0.08°$$

In the above example, the Y-axis of the coordinate system in FIG. 8 had been chosen parallel to the cutter axis of rotation and the extension of the Z-axis to the left (negative direction intersects with the cutter axis of rotation. The theoretical blade front is oriented in the plane which is defined by the Y and Z axes. Although stick blades in cutter heads are commonly inclined with their length direction versus the Y-axis and have an offset with their theoretical front face versus the Z-axis, the principle function of the adjustment will not change and the resulting blade tip position and angle changes will differ insignificantly if at all.

With respect to the modified seating surface, the magnitude of the recess or modification depth may be any amount depending upon the parameters of the cutting tool and the cutting process. However, the preferred range is between 0.010 mm and 0.050 mm. The height of the recess or modified area is preferably about 50% to about 75% of the clamping length. The inventive cutter head design applies to tool systems with or without clamp blocks.

Figure 9:
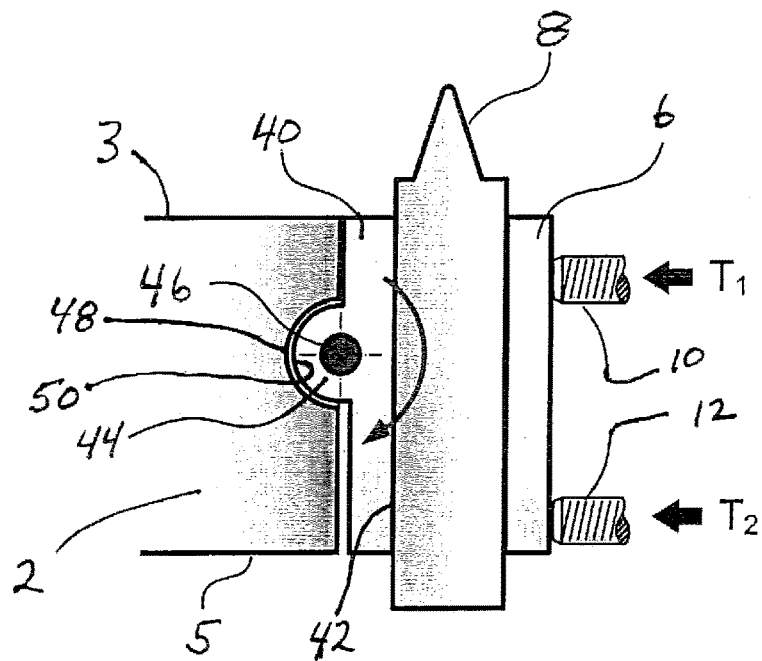
FIG. 9 shows a cross sectional view of a clamp block-blade-seating surface arrangement but instead of the modified blade seating surface of FIG. 2(a), it shows a pivot block which has the blade seating surface on its right side and a pivot arrangement on the left side (towards the cutter center).

In an alternative embodiment, FIG. 9 shows a cross sectional view of a clamp block-blade-seating surface arrangement but instead of the modified blade seating surface in FIG. 2(a) it shows a swivel element 40 which has the blade seating surface 42 on its right side and a pivot arrangement 44 on the left side (towards the cutter center). The pivot arrangement 44 can be accomplished with a pivot pin 46 or just by the pivot surfaces 48, 50. The upper clamp screw 10 is tightened to the specified torque after the blade is in the slot 20. The lower clamp screw 12 is then preferably tightened to the same torque. After radial blade position measurement it is now possible to turn the upper screw 10 out by an amount, such as 5° (screw rotation) for example. Then the lower screw 12 may be turned in by the same amount (e.g. 5°) for example, although equal amounts of rotation for screws 10 and 12 are not required. Depending on the lead of the screw threads, the example of 5 degrees of screw rotation will move the blade tip radially out by about 0.039 mm.

Figure 10:
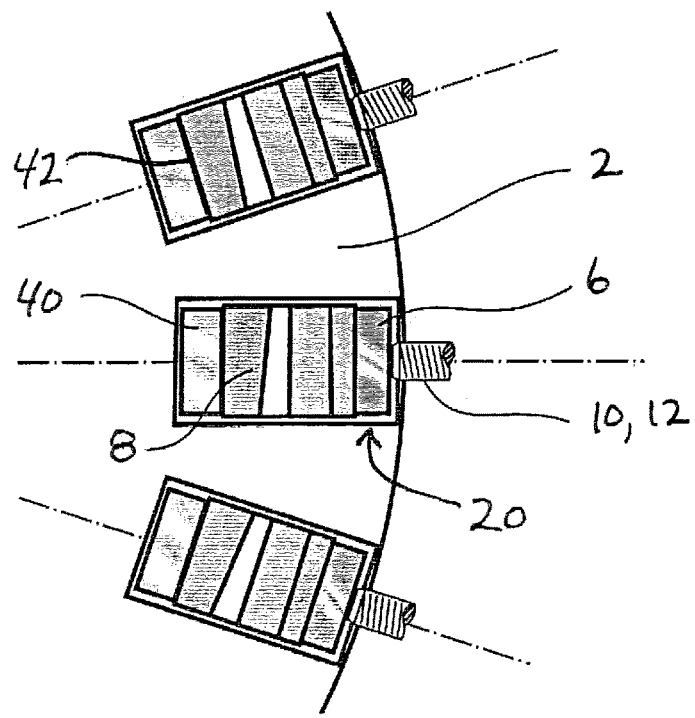
FIG. 10 shows a top view onto a section of the cutter head from FIG. 9 with three blade slots with blades shown.

FIG. 10 shows a top view onto a section of the cutter head from FIG. 9 with three blade slots 20 with blades 8 shown. The swivel elements 40 are visible to the left of the seating surfaces 42.

Figure 11:
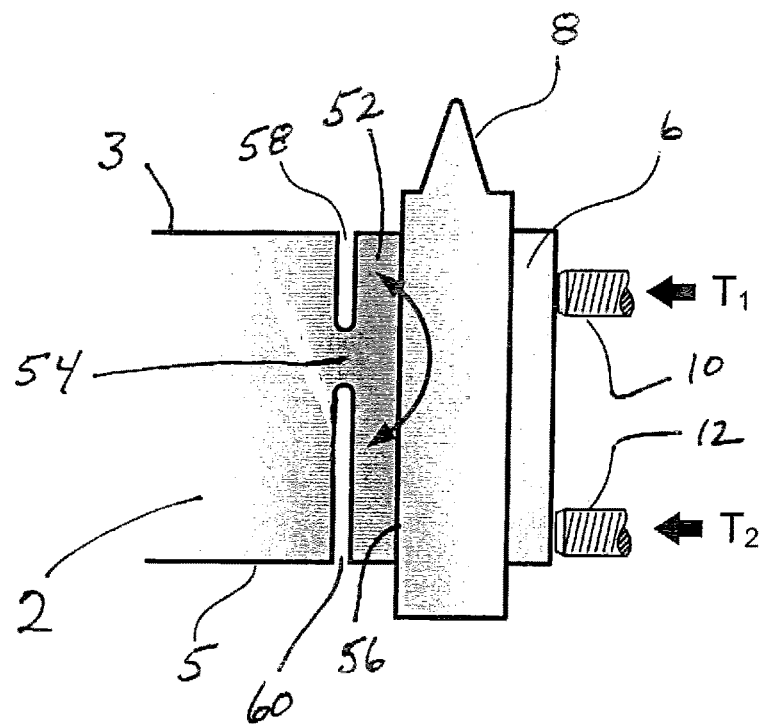
FIG. 11 shows a cross sectional view of a clamp block-blade-seating surface arrangement but instead of the modified blade seating surface in FIG. 2(a) it shows a pivot block with a compliance element instead of a mechanical pivot axis.

FIG. 11 shows a cross sectional view of a clamp block-blade-seating surface arrangement but instead of the modified blade seating surface in FIG. 2(a) it shows a swivel element 52 with a compliance element 54 instead of a mechanical pivot axis. This element uses the linear elastic property of the cutter head material (e.g. steel) in order to allow the seating surface 56 to pivot. The blade seating surface 56 is located on the right side of swivel element 52 and a pivot arrangement (i.e. the compliance element 54) is located on the left side (towards the cutter center). The pivoting center in this embodiment is accomplished by the compliance element 54 in the form of a rib between upper and the lower compliance slots 58, 60. The amount of compliance can be controlled by the thickness of the rib. Both clamp screws 10, 12 are tightened to the specified torque after the blade 8 is in the slot 20. After radial blade position measurement, the upper screw may be turned out by an amount, such as 5° (counterclockwise screw rotation) for example. The lower screw may then be turned in by a similar amount (e.g. 5°) in clockwise direction although equal amounts of rotation for screws 10 and 12 are not required. Depending on the lead of the screw threads, the example of 5 degrees of screw rotation will move the blade tip radially out by about 0.039 mm.

Figure 12:
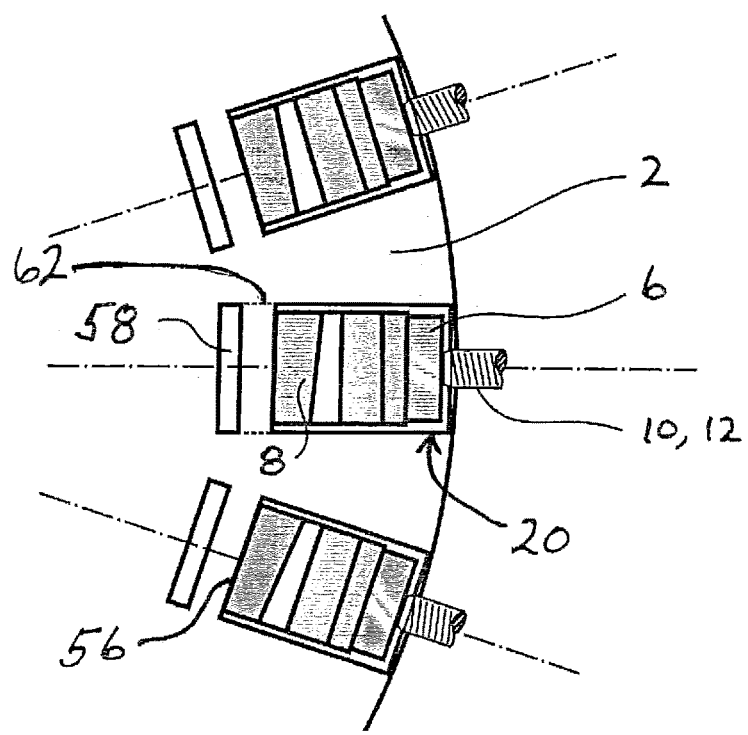
FIG. 12 shows a top view onto a section of the cutter head from FIG. 11 with three blade slots with blades shown.

FIG. 12 shows a top view onto a section of the cutter head 2 from FIG. 11 with three blade slots 20 with blades 8 shown. The compliance elements are only visible by the gaps 58 to the left of the seating surfaces 56. The dotted connections 62 between the compliance slot 58 and seating surface 56 represent optional thin slots, manufactured (e.g. by wire EDM) which assure sufficient swivel rotation (rotational arrow in FIG. 11) during the blade adjusting procedure. Preferably, the width of a compliance slot 58 is generally equal to the width of the blade seating surfaces and may be positioned parallel to the blade seating surfaces or perpendicular to the cutter radius.

It is understood that blade systems which use blades with inside and outside cutting edges on each blade (e.g. U.S. Pat. No. 7,775,749) require a special kind of radial blade adjustment. If the blade tip radius is increased, then both cutting edges of such a blade move to a larger radius. However, the inventive tool for adjustable blade radii is well suited in order to find optimal compromises for the radial location of both cutting edges of one blade and realize them.

It should be understood that the preferred embodiment of the inventive method will only increase the blade tip radius but not reduce it. Cutter heads might require reduction or increase of the blade tip radius in order to adjust them to a reference blade. Since the reference blades are chosen arbitrarily (e.g. the blade in the slot labeled "1" as reference outside blade and the blade in the slot labeled "2" as reference inside blade), it is possible to chose the outside and inside blade with the largest radius as reference blades. With the inventive procedure, it will always be possible to improve all blades of one kind (inside or outside) towards the radius of the respective reference blade. The radius variation between theoretically correct cutter radius and effective radius of an arbitrarily chosen reference blade is in most cases below 0.002 mm and therefore has no measurable influence to the machined tooth surfaces.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A bevel gear face cutter head for face hobbing and face milling of bevel and hypoid gears, said cutter head being generally disc-shaped and rotatable about a cutter head axis, said cutter head comprising:
   a top surface and a bottom surface,
   one or more cutting blade positioning slots arranged in said cutter head with each of said blade positioning slots extending between said top and bottom surfaces and with each of said blade positioning slots defining a four-sided shaped cross-section,
   said cutting blade positioning slots each having at least one blade seating surface extending between said top and bottom surfaces,
   said at least one blade seating surface having a modified shape and extending from said top surface to said bottom surface wherein said modified shape departs from the straight line shape of a continuous straight seating surface extending from said top surface to said bottom surface,
   wherein the cutter head is capable of clamping a cutting blade having a four-sided shaped cross-section to the at least one blade seating surface such that the blade is pre-clamped and axially located and is capable of thereafter having the radial location of the blade tip adjusted by an increase of the torque of a clamp screw located in the area of the modified portion of the blade seating surface.

2. The cutter head of claim 1 wherein said modified shape comprises:
   a first portion extending from one of said top or bottom surface to a predetermined location between said top and bottom surfaces, said first portion having a first shape,
   a second portion extending from said predetermined location to the other of said top or bottom surface, said second portion having a shape such that the shape of said first portion and the shape of said second portion together do not describe a continuous straight line extending from said top surface to said bottom surface.

3. The cutter head of claim 2 wherein the shape of at least one of said first portion and said second portion is curved.

4. The cutter head of claim 2 wherein the shape of at least one of said first portion and said second portion is straight.

5. The cutter head of claim 2 further including one or more clamp screws.

6. The cutter head of claim 5 comprising one clamp screw positioned to exert a force at said predetermined location.

7. The cutter head of claim 5 comprising two clamp screws with a first clamp screw positioned to exert a force on said first portion and a second clamp screw positioned to exert a force on said second portion.

8. The cutter head of claim 5 comprising two clamp screws with a first clamp screw positioned to exert a force on a corner of a cutting blade and a second clamp screw positioned to exert a force on said first portion or said second portion.

9. The cutter head of claim 1 wherein said one or more cutting blade positioning slots defines a generally square or rectangular shaped cross section.

10. The cutter head of claim 9 wherein said one or more cutting blade positioning slots include two blade seating surfaces.

11. The cutter head of claim 10 further including at least one clamping screw positioned to exert a force against one of said two blade seating surfaces.

12. The cutter head of claim 11 wherein the other of said two blade seating surfaces is unmodified.

13. The cutter head of claim 1 further including angular clamp blocks.

* * * * *